US012761425B2

(12) United States Patent
Huang et al.

(10) Patent No.: US 12,761,425 B2
(45) Date of Patent: Oct. 13, 2026

(54) RELEASE MECHANISM OF TRANSCEIVER MODULE

(71) Applicants: Xiaolei Huang, Chengdu (CN); Xiancai Liu, Chengdu (CN); Xuegang Zhu, Chengdu (CN); Liang Zou, Chengdu (CN)

(72) Inventors: Xiaolei Huang, Chengdu (CN); Xiancai Liu, Chengdu (CN); Xuegang Zhu, Chengdu (CN); Liang Zou, Chengdu (CN)

( * ) Notice: Subject to any disclaimer, the term of this patent is extended or adjusted under 35 U.S.C. 154(b) by 383 days.

(21) Appl. No.: 18/207,361

(22) Filed: Jun. 8, 2023

(65) Prior Publication Data

US 2024/0319450 A1 Sep. 26, 2024

(30) Foreign Application Priority Data

Mar. 20, 2023 (CN) ......................... 202320550010.7

(51) Int. Cl.
*G02B 6/38* (2006.01)

(52) U.S. Cl.
CPC .................................. *G02B 6/3898* (2013.01)

(58) Field of Classification Search
CPC ............................ G02B 6/4261; G02B 6/3898
See application file for complete search history.

(56) References Cited

U.S. PATENT DOCUMENTS

| | | | | |
|---|---|---|---|---|
| 6,692,159 B2 * | 2/2004 | Chiu | G02B 6/4261 385/53 |
| 8,226,305 B2 * | 7/2012 | Thirugnanam | G02B 6/4292 385/91 |
| 9,176,289 B2 * | 11/2015 | Yi | G02B 6/4284 |
| 9,929,500 B1 * | 3/2018 | Ista | H01R 13/6271 |
| 11,098,738 B2 * | 8/2021 | Lu | F16B 2/14 |
| 2009/0274468 A1 * | 11/2009 | Zhang | G02B 6/4201 398/139 |
| 2010/0067199 A1 * | 3/2010 | Chen | G02B 6/4201 361/747 |
| 2019/0203750 A1 * | 7/2019 | Lu | F16B 2/185 |
| 2020/0183106 A1 * | 6/2020 | Lun | H01R 13/6275 |
| 2022/0182148 A1 * | 6/2022 | Ku | H04B 10/40 |
| 2024/0319450 A1 * | 9/2024 | Huang | G02B 6/4246 |

* cited by examiner

*Primary Examiner* — Rhonda S Peace

(57) ABSTRACT

Embodiments of present invention provides a pluggable optical transceiver module. The transceiver module includes a top cover and a bottom cover; a release mechanism; and a set of springs, where the release mechanism includes a pull tab; a latch; and a shaft, wherein the pull tab is connected with the latch by the shaft and the pull tab, the latch, and the shaft have an interference fit, a transition fit, or a clearance fit.

19 Claims, 7 Drawing Sheets

RELEASE MECHANISM OF TRANSCEIVER MODULE

FIELD OF THE INVENTION

The present application relates generally to optical transceiver modules, and more particularly to the release mechanism of optical transceiver modules.

BACKGROUND

Pluggable optical transceivers or transceiver modules have been widely used in high-speed data communication over fiber-optic networks. The transceiver modules are usually plugged into a bay of networking equipment and locked into the bay or individual cages or slots that house the transceiver modules. The transceiver modules include a release mechanism, and the release mechanism has a latch that locks the transceiver modules into the individual cages.

Conventionally, with a mechanical package of QSFP+, QSFP-DD, or OSFP whose terms are defined in their corresponding multi-source agreement (MSA) specifications, the release mechanism of a transceiver module generally includes two main parts, that is, a pull tab and a latch. The transceiver module may also have latching pockets at both sides, where the latch may be assembled. The pull tab and latch are integrated together or manufactured as a whole part or single piece. When pulling the pull tab, the latch will slide along the latching pockets. A release of the latch will jack up a latch flap of the cage, such that the transceiver module may be extracted from the cage that houses the transceiver module.

FIG. 1 demonstratively illustrates a transceiver module 10 with a currently known typical release mechanism in an explosive view. The mechanical part of the transceiver module 10 mainly includes a top cover 101, a bottom cover 102, a release mechanism 110, and a set of springs 105. The release mechanism 110 may include a pull tab 103 and a latch 104 that are integrated together as a whole part or single piece. When the pull tab 103 is pulled, the latch 104 will slide along a set of latching pockets at the sides of the transceiver module 10. A release of the latch 104 will then jack up the latch flap of the cage, such that the transceiver module 10 may be extracted from the cage. The latch 104 may be reset by the elastic force of the set of springs 105.

It is recognized that there exist some concerns and/or issues with the typical release mechanism 110 illustrated in FIG. 1. First, an optical fiber jumper may be obstructed by the pull tab 103 when inserting it into the transceiver module 10 or extracting it out. Secondly, the material that makes up the pull tab 103 is usually rubber or plastic, such that the size of the pull tab 103 is made relatively large in order to ensure strength of the pull tab 103, which consequently will occupy more space of the transceiver module 10 and is adverse for optical interface design. Lastly, some module information may need to be identified by color and/or marking on the pull tab 103, so for a module manufacturer, sometimes there is a need to replace the pull tab 103 for different customers, which is a complex operation for the typical release mechanism 110.

SUMMARY

Embodiments of present invention provide a transceiver module. The transceiver module includes a top cover and a bottom cover; a release mechanism; and a set of springs, where the release mechanism includes a pull tab; a latch; and a shaft, wherein the pull tab is connected with the latch by the shaft.

In one embodiment, the pull tab, the latch, and the shaft have an interference fit, a transition fit, or a clearance fit.

In another embodiment, the release mechanism further includes a torsion spring mated with the shaft, the torsion spring applies a torque to the pull tab during a reset.

In one embodiment, the shaft is a detachable shaft and includes a bolt and a nut, wherein the nut is detachable from the bolt through un-screwing to remove the shaft from the release mechanism.

In another embodiment, the shaft is a detachable shaft and includes a main-shaft and a cap, wherein the cap is detachable from the main-shaft through a snap-off action to remove the shaft from the release mechanism.

In one embodiment, the pull tab includes a sheet metal plate part and a rubber/plastic part, wherein the sheet metal plate part has increased stiffness with bent sides.

According to one embodiment, the transceiver module further includes a set of latch pockets at the sides, where the latch of the release mechanism is assembled in the set of latch pockets and engaged with the set of spring.

In one embodiment, the pull tab and the latch have rolled portions thereof respectively, and the rolled portions of the pull tab and the latch mate with the shaft.

BRIEF DESCRIPTION OF THE DRAWINGS

The present invention will be understood and appreciated more fully from the following detailed description of embodiments of the invention, taken in conjunction with accompanying drawings of which.

Figure 1:
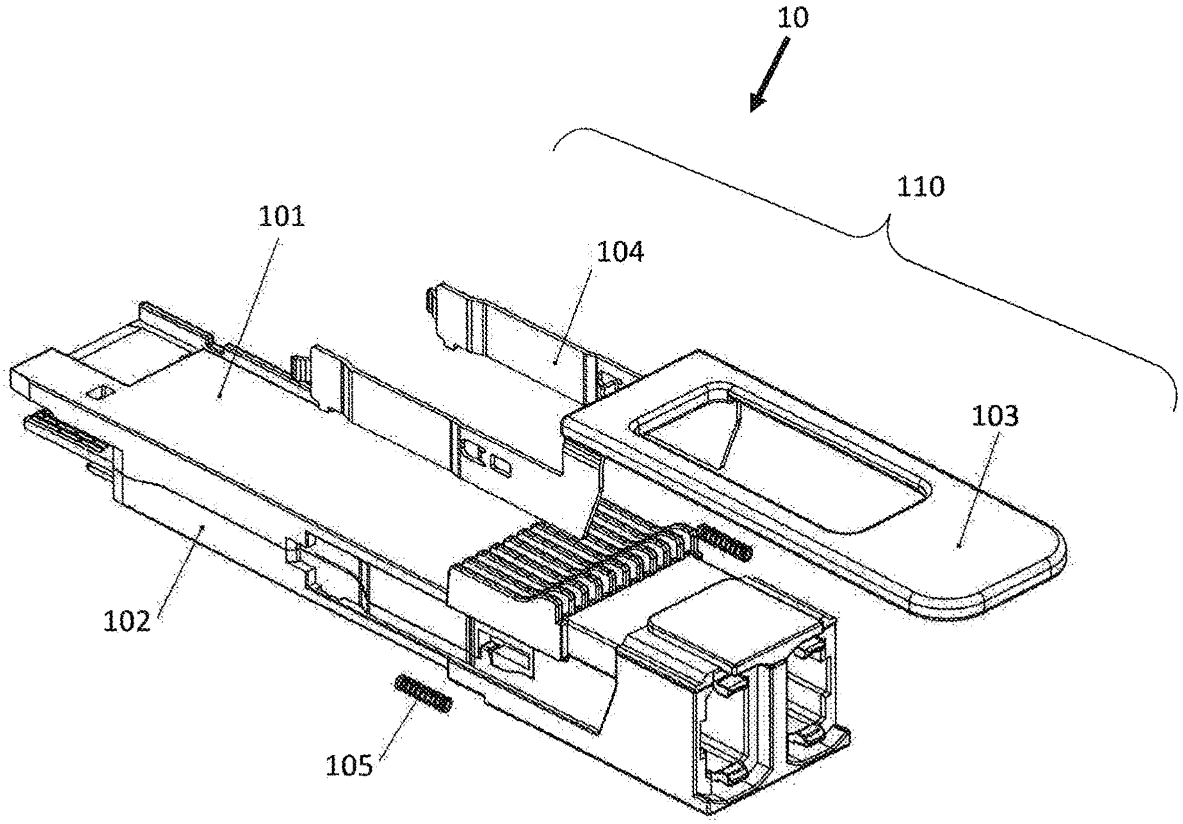
FIG. 1 (Prior Art)
FIG. 1 is a demonstrative illustration of explosive view of a transceiver module with a currently known typical release mechanism.

It will be appreciated that for simplicity and clarity purpose, elements shown in the drawings have not necessarily been drawn to scale.

DETAILED DESCRIPTION OF PREFERRED EMBODIMENT

Embodiments of present invention provide a new release mechanism used in the locking and unlocking of pluggable transceiver modules in a data communication fiber-optic network. The transceiver modules may be plugged into a communication bay that has multiple individual cages or slots for housing multiple transceiver modules. The transceiver modules, with the new release mechanism, may be manufactured to have mechanical packages of QSFP+, QSFP-DD, OSFP, etc., and be compatible and in compliance with the MSA specifications.

More particularly, embodiments of present invention provide a release mechanism that includes a pull tab; a latch; and a shaft, with the pull tab being connected with the latch by the shaft. The pull tab may be rotated around the shaft, which is convenient for insertion and extraction of optical fiber jumper to the transceiver module. Moreover, the pull tab may be replaced, if necessary, by disconnecting from the latch through the removal of the shaft. The pull tab may include a sheet metal plate part and a rubber and/or plastic part. Compared with traditional pull tab that is made entirely of rubber and/or plastic and thus is bulky, the sheet metal plate part of the pull tab has a smaller size but a higher strength, compared with rubber and/or plastic, and saves more space for optical interface design. The sheet metal plate part is also bent to increase the stiffness.

Figure 2:
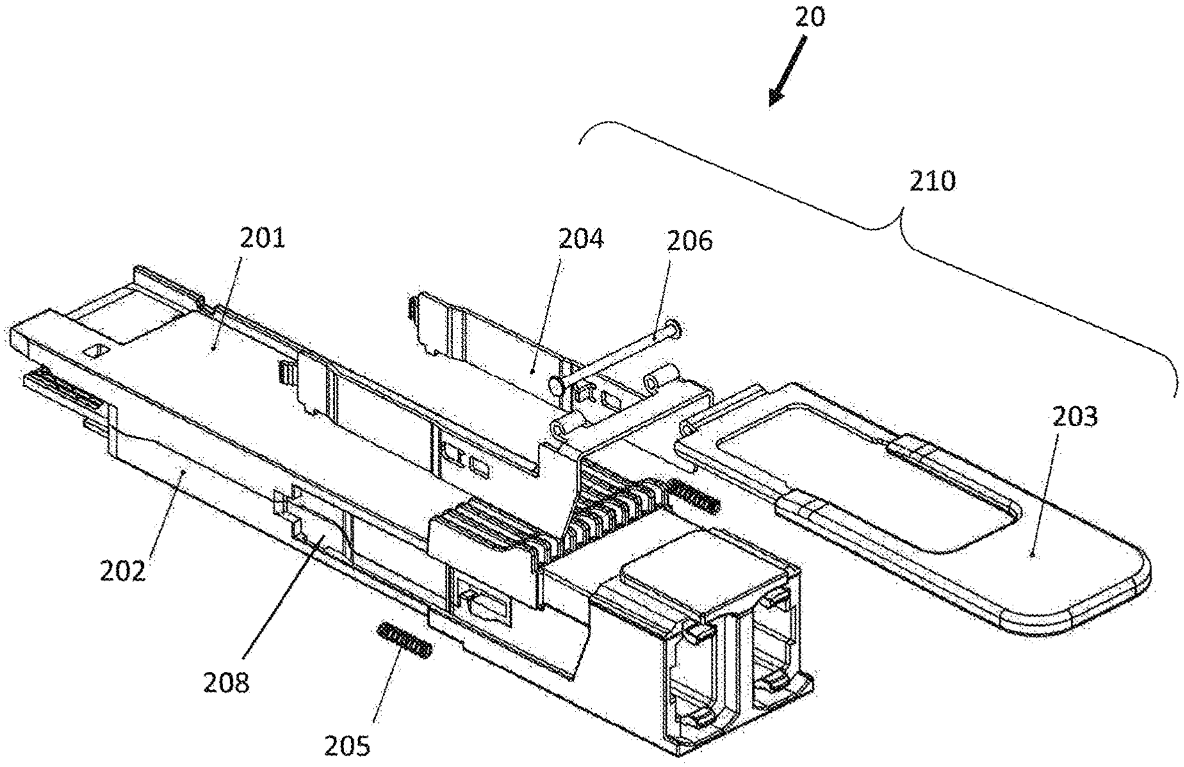
FIG. 2 is a demonstrative illustration of explosive view of a transceiver module with a new release mechanism according to one embodiment of present invention.

FIG. 2 is a demonstrative illustration of explosive view of a transceiver module with a new release mechanism according to one embodiment of present invention. More particularly, embodiments of present invention provide a transceiver module 20 that includes a top cover 201, a bottom cover 202, a release mechanism 210, and a set of springs 205. Different from the typical release mechanism 110 illustrated in FIG. 1, the release mechanism 210 of the transceiver module 20 includes a pull tab 203, a latch 204, and a shaft 206. The pull tab 203 is connected with the latch 204 by the shaft 206 and may be rotated around the shaft 206. The latch 204 is assembled in a set of latch pockets 208 at the sides of the transceiver module 20 and is engaged with the set of springs 205. This rotatable function of the pull tab 203 provides an important convenience during the insertion and extraction of optical fiber jumper to the transceiver module 20. In one embodiment, the shaft 206 is a detachable shaft and the pull tab 203 is a replaceable pull tab. The replaceable and rotatable pull tab design offers an optical interface design whose features and functionality is unmatched by the current typical release mechanism 110.

Figure 3:
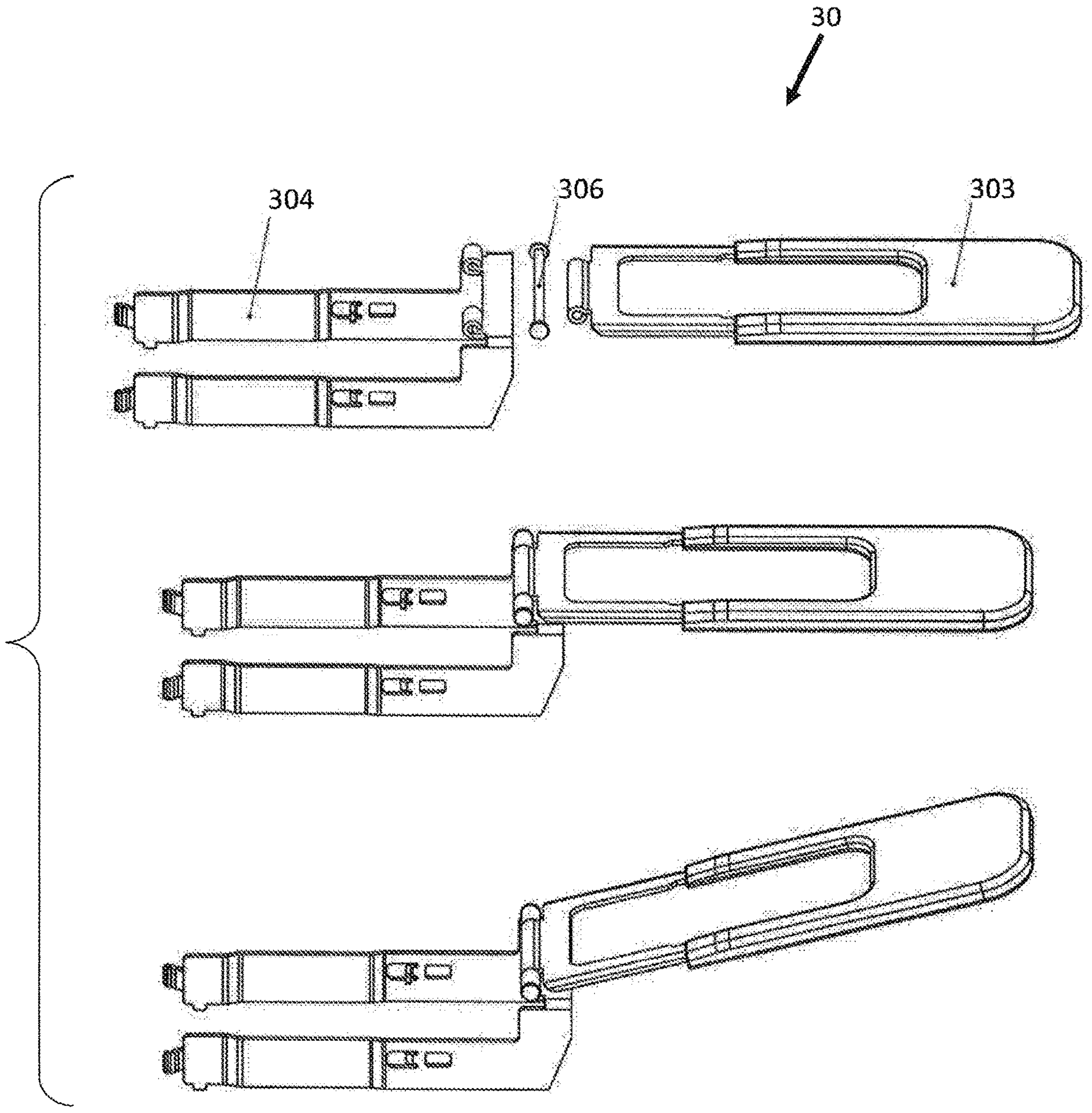
FIG. 3 is a demonstrative illustration of a new release mechanism according to one embodiment of present invention.
Figure 4:
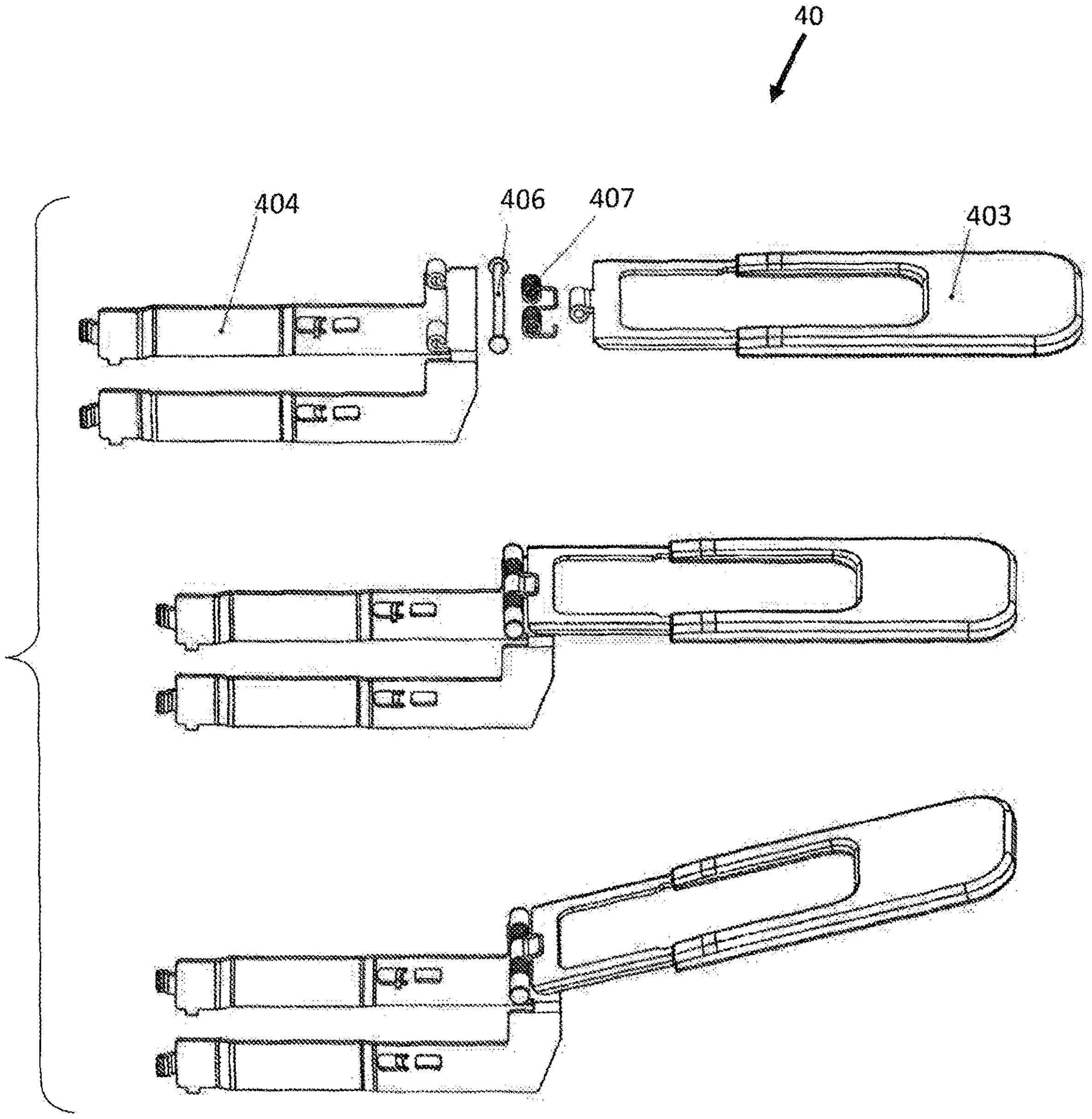
FIG. 4 is a demonstrative illustration of a new release mechanism according to another embodiment of present invention.

As is discussed above, the pull tab 203 is connected with the latch 204 by the shaft 206 and may be rotated around the shaft 206. Various embodiments of mechanical structures may be arranged or used to achieve the above functionality of the release mechanism 210. As a non-limiting example, FIG. 3 is a demonstrative illustration of a release mechanism 30 according to one embodiment of present invention. More particularly, FIG. 3 includes an explosive view at the top, an assembled status view in the middle, and a rotated status view at the bottom, of the release mechanism 30. In one embodiment, the release mechanism 30 includes a pull tab 303, a latch 304, and a shaft 306 and has an interference fit (or transition fit) among the pull tab 303, the latch 304, and the shaft 306 such that the pull tab 303 may be rotated around the shaft 306 to an angle and remain at that angle under the action of friction. The pull tab 303 and the latch 304 may each have a rolled portion that mate with the shaft 306 in the interference fit (or transition fit), and a tolerance among the mating parts enables the above function of the pull tab 303. As another non-limiting example, FIG. 4 is a demonstrative illustration of a release mechanism 40 according to another embodiment of present invention. More particularly, FIG. 4 includes an explosive view at the top, an assembled status view in the middle, and a rotated status view at the bottom, of the release mechanism 40. The release mechanism 40 has a pull tab 403, a latch 404, and a shaft 406 and has a clearance fit among the pull tab 403, the latch 404, and the shaft 406. The pull tab 403 and the latch 404 may each have a rolled portion that mate with the shaft 406 in the clearance fit. Embodiments of present invention further provide a torsion spring 407 that is part of the clearance fit. The torsion spring 407 helps realize the reset of the pull tab 403. For example, the pull tab 403 may be rotated around the shaft 406 freely to any angle and may be reset under the action of torque produced by the torsion spring 407.

Figure 5:
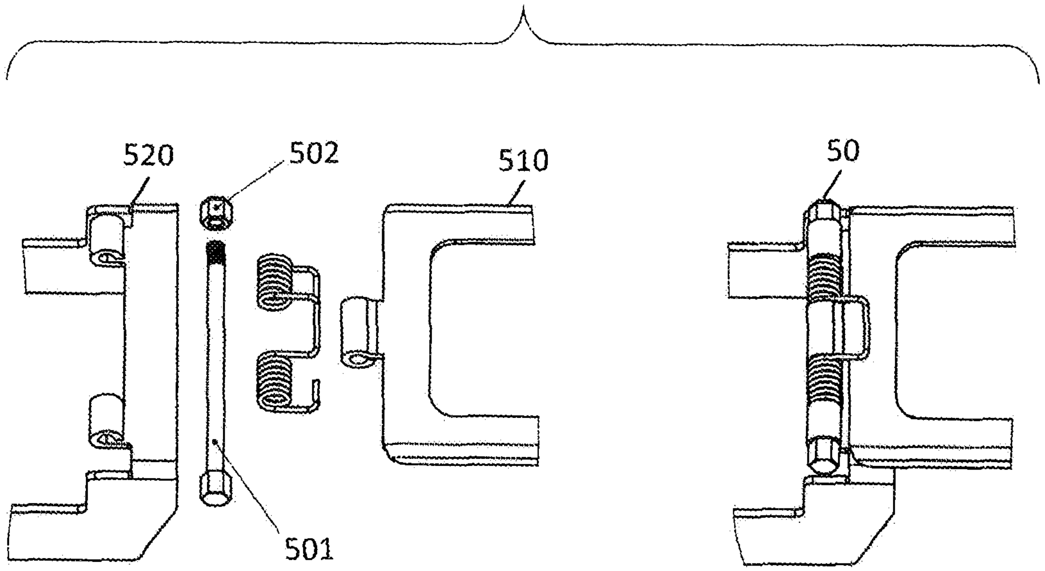
FIG. 5 is a demonstrative illustration of a shaft used in a new release mechanism according to one embodiment of present invention.
Figure 6:
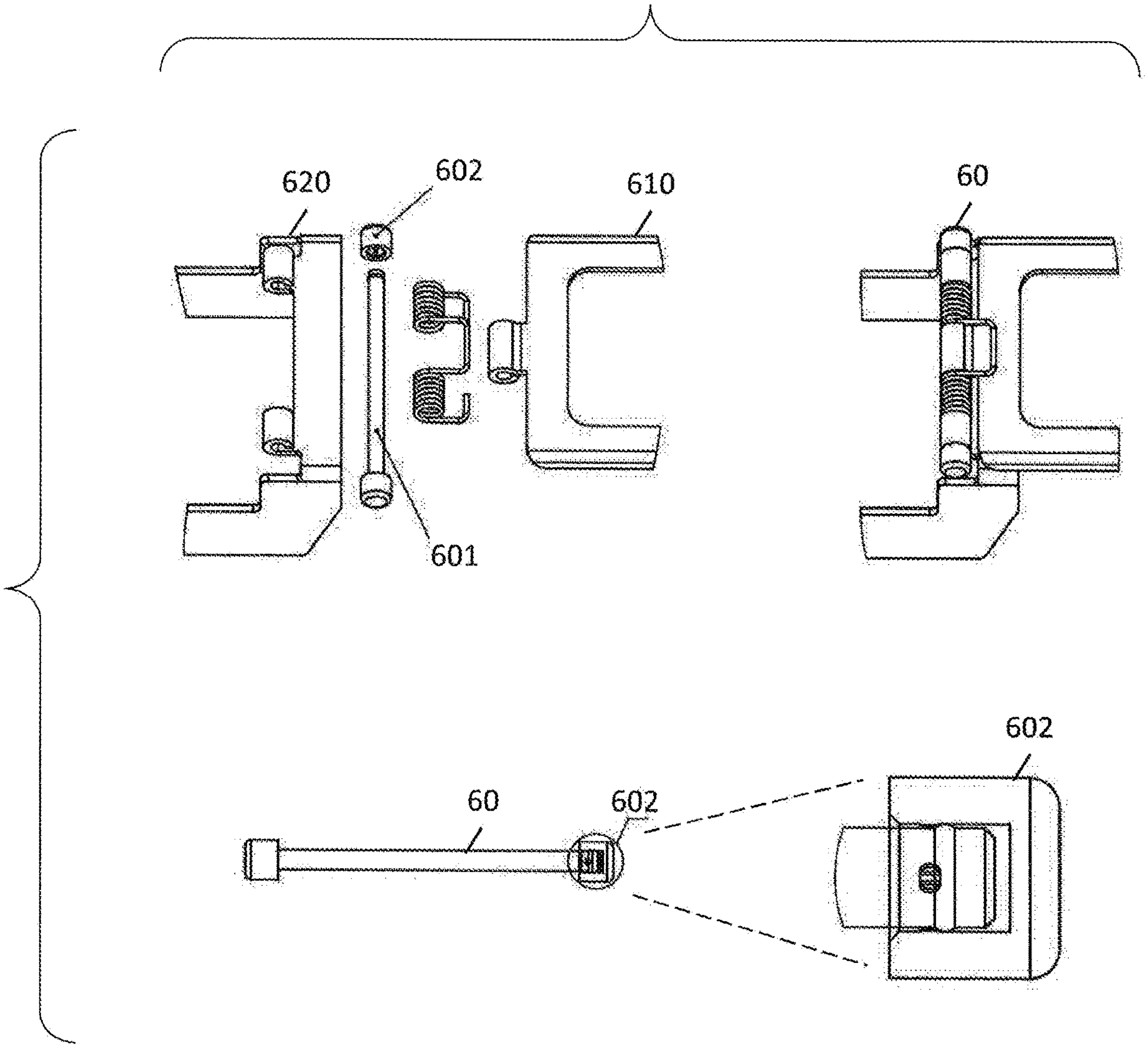
FIG. 6 is a demonstrative illustration of a shaft used in a new release mechanism according to another embodiment of present invention.

Various embodiments of mechanical structures may be used to form a shaft such as a detachable shaft. As one example, FIG. 5 is a demonstrative illustration of a shaft 50 used in a new release mechanism according to one embodiment of present invention. More particularly, FIG. 5 includes an explosive view at the left and an assembled status view at the right of the shaft 50. The shaft 50 may include a bolt 501 and a nut 502, and the nut 502 may be screwed onto the bolt 501 to form the shaft 50, for example, in a clearance fit to connect a pull tab 510 with a latch 520. Alternatively, the nut 502 is detachable from the bolt 501 through un-screwing to remove the shaft 50 from the release mechanism. Made of the bolt 501 and the nut 502, the shaft 50 is a detachable shaft, which enables the pull tab 510 to become a replaceable pull tab. As another example, FIG. 6 is a demonstrative illustration of a shaft 60 used in a new release mechanism according to another embodiment of present invention. More particularly, FIG. 6 includes an explosive view at the upper-left side; an assembled status view at the upper-right side; and an expanded view at the bottom of the shaft 60. The shaft 60 may include a main-shaft 601 and a cap 602, and the cap 602 may be snapped onto the main-shaft 601 to form the shaft 60. As is illustrated in the expanded view at the bottom, salient features such as interlocking elements are built into the main-shaft 601 and the cap 602 such that the main-shaft 601 may be snapped into the cap 602 in a snap-fit fashion. Alternatively, the cap 602 is detachable from the main-shaft 601 through a snap-off action to remove the shaft 60 from the release mechanism. Being able to connect or disconnect a pull tab 610 with a latch 620, for example, in a clearance fit through the action of snap-on or snap-off of the cap 602, the shaft 60 is a detachable shaft, which enables the pull tab 610 to become a replaceable pull tab.

Figure 7:
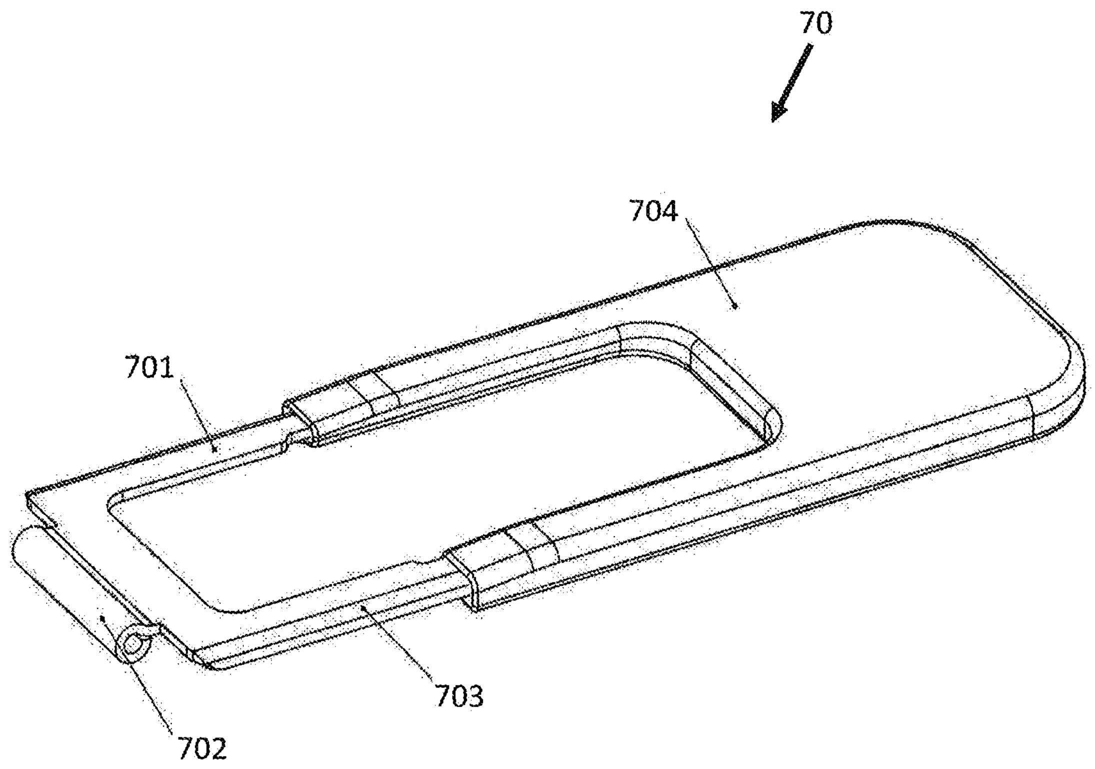
FIG. 7 is a demonstrative illustration of a pull tab used in a new release mechanism according to one embodiment of present invention.

FIG. 7 is a demonstrative illustration of a pull tab 70 according to one embodiment of present invention. The pull tab 70 may include a sheet metal plate part 701 and a rubber and/or plastic part 704. The sheet metal plate part 701 further includes a rolled portion 702 to mate with a shaft for connecting the pull tab 70 with a latch. The sheet metal plate part 701 may also include bent sides 703 to increase stiffness of the sheet metal plate. The rubber and/or plastic part 704 may be made for comfort in handling the pull tab 70, through touch and feel, and for ease of imprinting product information as needed. According to embodiment of present invention, compared with a typical pull tab 103 as illustrated in FIG. 1, the size of the pull tab 70 may be made more compact, which saves space for optical interface design.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A transceiver module comprising a release mechanism, the release mechanism comprising:

a pull tab;

a latch; and a shaft, wherein the pull tab is connected with the latch by the shaft; and comprising a top cover, a bottom cover, and a set of springs, wherein the latch of the release mechanism is assembled in a latch pocket at sides of the transceiver module and engaged with the set of springs.

2. The transceiver module of claim 1, wherein the pull tab, the latch, and the shaft have an interference fit or a transition fit such that the pull tab is rotatable around the shaft to an angle and remain at the angle under action of friction.

3. The transceiver module of claim 1, wherein the pull tab, the latch, and the shaft have a clearance fit, wherein the shaft is a detachable shaft and the pull tab is a replaceable pull tab.

4. The transceiver module of claim 3, wherein the release mechanism further comprises a torsion spring mated with the shaft, the torsion spring applies a torque to the pull tab during a reset.

5. The transceiver module of claim 1, wherein the shaft is a detachable shaft and comprises a bolt and a nut, wherein the nut is screwed onto the bolt to form the shaft.

6. The transceiver module of claim 1, wherein the shaft is a detachable shaft and comprises a main-shaft and a cap, wherein the cap is snapped onto the main-shaft to form the shaft in a snap-fit fashion.

7. The transceiver module of claim 1, wherein the pull tab comprises a combination of a sheet metal plate part and a rubber/plastic part attached to the sheet metal plate part, wherein the sheet metal plate part has bent sides.

8. The transceiver module of claim 7, wherein the pull tab and the latch have rolled portions thereof respectively, and the rolled portions of the pull tab and the latch mate with the shaft.

9. A transceiver module comprising:

a top cover and a bottom cover; a release mechanism; a set of springs; and a set of latch pockets at sides of the transceiver module, wherein the release mechanism comprises:

a pull tab;

a latch; and a shaft, wherein the pull tab is connected with the latch by the shaft; and wherein the latch of the release mechanism is assembled in the set of latch pockets and engaged with the set of springs.

10. The transceiver module of claim 9, wherein the pull tab, the latch, and the shaft have an interference fit, a transition fit, or a clearance fit.

11. The transceiver module of claim 10, wherein the release mechanism further comprises a torsion spring mated with the shaft, the torsion spring applies a torque to the pull tab during a reset.

12. The transceiver module of claim 9, wherein the shaft is a detachable shaft and comprises a bolt and a nut, wherein the nut is detachable from the bolt through un-screwing to remove the shaft from the release mechanism.

13. The transceiver module of claim 9, wherein the shaft is a detachable shaft and comprises a main-shaft and a cap, wherein the cap is detachable from the main-shaft through a snap-off action to remove the shaft from the release mechanism.

14. The transceiver module of claim 9, wherein the pull tab comprises a combination of a sheet metal plate part and a rubber/plastic part attached to the sheet metal plate part, wherein the sheet metal plate part has increased stiffness with bent sides.

15. The transceiver module of claim 9, the pull tab and the latch have rolled portions thereof respectively, and the rolled portions of the pull tab and the latch mate with the shaft.

16. A release mechanism of transceiver module comprising:

a pull tab;

a latch; and a shaft, wherein the pull tab is connected with the latch by the shaft, wherein the pull tab comprises a combination of a sheet metal plate part and a rubber/plastic part attached to the sheet metal plate part, and the sheet metal plate part has bent sides with increased stiffness; and wherein the pull tab and the latch have rolled portions thereof respectively, and the rolled portions of the pull tab and the latch mate with the shaft.

17. The release mechanism of claim 16, wherein the pull tab, the latch, and the shaft have an interference fit, a transition fit, or a clearance fit.

18. The release mechanism of claim 16, further comprising a torsion spring mated with the shaft, wherein the torsion spring applies a torque to the pull tab during a reset process of the pull tab.

19. The release mechanism of claim 16, further comprising a top cover, a bottom cover, a set of springs and a set of latch pockets at sides of the transceiver module, wherein the release mechanism of the latch is assembled in the set of latch pockets and engaged with the set of springs.

* * * * *